United States Patent
Evoy et al.

[11] Patent Number: 5,805,980
[45] Date of Patent: Sep. 8, 1998

[54] COMMUNICATION RECEIVER FOR CONTROLLING A RECEIVE OPERATION IN RESPONSE TO A CONTROL VALUE

[75] Inventors: Ronald Hugh Evoy, West Palm Beach; David Jeffery Hayes, Lake Worth; Von Alan Mock; Matthew Joseph Stanislawski, both of Boynton Beach, all of Fla.

[73] Assignee: Motorola, Inc., Schaumburg, Ill.

[21] Appl. No.: 976,131

[22] Filed: Aug. 28, 1997

Related U.S. Application Data

[63] Continuation of Ser. No. 523,669, Sep. 5, 1995, abandoned.

[51] Int. Cl.$^6$ .............................. H04Q 7/00; H04J 15/00
[52] U.S. Cl. ...................... 455/38.3; 455/343; 370/311
[58] Field of Search ................... 455/38.1, 38.2, 455/38.3, 63, 343, 70, 71, 72, 574; 340/825.44; 370/311

[56] References Cited

U.S. PATENT DOCUMENTS

| | | | |
|---|---|---|---|
| 4,897,835 | 1/1990 | Gaskill et al. . | |
| 4,956,641 | 9/1990 | Matai et al. | 340/825.44 |
| 5,159,331 | 10/1992 | Park et al. | 340/825.44 |
| 5,168,493 | 12/1992 | Nelson et al. | 455/38.1 |
| 5,175,874 | 12/1992 | Auchter | 455/343 |
| 5,274,843 | 12/1993 | Murai et al. | 455/38.3 |
| 5,325,088 | 6/1994 | Willard et al. . | |
| 5,406,613 | 4/1995 | Peponides et al. | 455/343 |
| 5,459,457 | 10/1995 | Sharpe | 455/343 |
| 5,475,374 | 12/1995 | Moore | 455/343 |
| 5,617,083 | 4/1997 | Schwendeman et al. | 340/825.44 |

*Primary Examiner*—Nguyen Vo
*Assistant Examiner*—Lester G. Kincaid
*Attorney, Agent, or Firm*—James A. Lamb

[57] ABSTRACT

A method and apparatus determine a response to a control value (316, 320) periodically transmitted by a communication system in at least one code word (306, 332) of a frame (302) of data of a communication protocol. The control value (316, 320) is for controlling a receive operation, such as the sleep interval for increasing battery life of a communication receiver (122) operating in the communication system. The receiver (122) accepts (404, 504) and stores (406, 506) earlier data from an earlier transmission of the frame (302) of data, and receives (408, 508) current data from a current transmission of the frame (302) of data. The receiver (122) thereafter makes a comparison (414, 512) of the earlier data and the current data, and selects from (a) performing (424, 520) the receive operation in accordance with a current control value received in the current data and (b) performing (418, 516, 528) the receive operation in accordance with an alternative (earlier or predetermined) control value, in respone to the comparison.

16 Claims, 6 Drawing Sheets

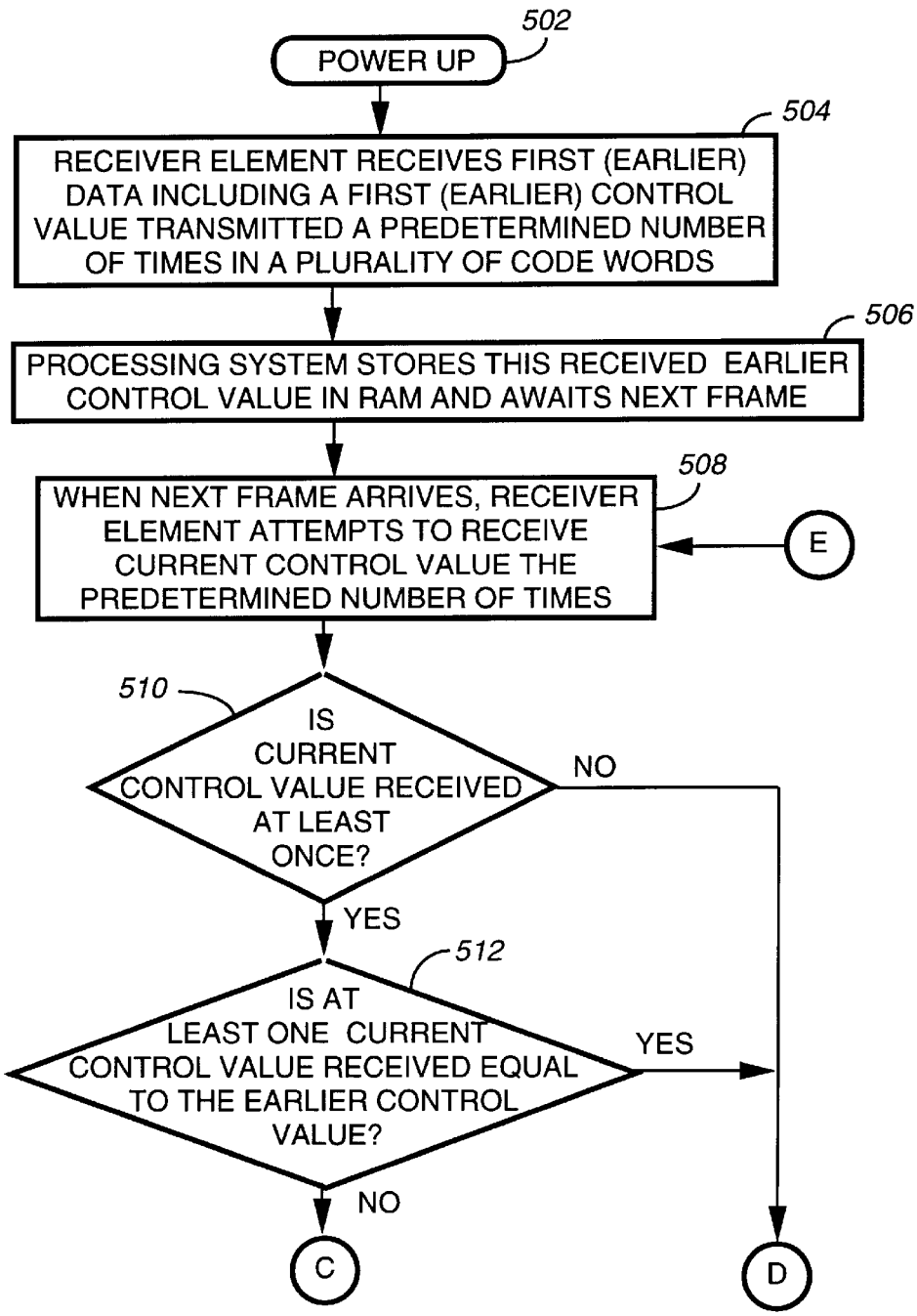

COMMUNICATION RECEIVER FOR CONTROLLING A RECEIVE OPERATION IN RESPONSE TO A CONTROL VALUE

This is a continuation of application Ser. No. 08/523,669, filed Sep. 5, 1995 and now abandoned.

FIELD OF THE INVENTION

This invention relates in general to radio communication systems, and more specifically to a method and apparatus for determining a response to a control value periodically transmitted by a communication system for controlling a receive operation of a receiver operating therein.

BACKGROUND OF THE INVENTION

Modern selective call signaling systems can provide periodic control signals for adjusting a receive operation, such as the operation of battery saving circuits in battery powered receivers operating within the system. Such control signals can modify the length of battery saving "sleep" intervals, thereby trading battery life for reduced latency (i.e., mean delay for receiving a message), and vice versa. Other control signals are used for further adjusting the receive operation in accordance with, for example, low traffic conditions and repeat message configuration.

The control signals preferably are sent in code words having error detection and correction capability. While this capability markedly decreases the probability that an erroneous control signal will be acted upon by the receivers, certain error conditions, e.g., certain bit patterns, can pass without detection. Undetected errors in receive operation control signals can result in missed messages (due to excessive "sleeping" or improper configuration), lower sensitivity (due to missed repeat messages), and reduced battery life (due to not "sleeping" enough).

Thus, what is needed is a method and apparatus for determining a response to a control value periodically transmitted by a communication system for controlling a receive operation of a receiver. Preferably, the method and apparatus will improve the probability of detecting and rejecting erroneous control values, thereby reducing the problems associated therewith.

SUMMARY OF THE INVENTION

An aspect of the present invention is a method of determining a response to a control value periodically transmitted by a communication system in at least one code word of a frame of data of a communication protocol. The control value is for controlling a receive operation of a receiver operating in the communication system. The method comprises in the receiver the steps of accepting and storing earlier data from an earlier transmission of the frame of data, and receiving current data from a current transmission of the frame of data. The method further comprises the steps of thereafter making a comparison of the earlier data and the current data, and selecting from (a) performing the receive operation in accordance with a current control value received in the current data and (b) performing the receive operation in accordance with an alternative control value, in response to the comparison.

Another aspect of the present invention is a communication receiver for determining a response to a control value periodically transmitted by a communication system in at least one code word of a frame of data of a communication protocol. The control value is for controlling a receive operation of the communication receiver while operating in the communication system. The communication receiver comprises a battery for supplying power to the communication receiver, and a switch coupled to the battery and coupled to a processing system for controlling the power to a receiver element. The communication receiver further comprises a memory for accepting and storing earlier data from an earlier transmission of the frame of data, and the receiver element coupled to the memory and coupled to the battery for receiving current data from a current transmission of the frame of data. The communication receiver also includes the processing system coupled to the memory and coupled to the receiver element for making a comparison of the earlier data and the current data. The processing system is programmed for selecting from (a) performing the receive operation in accordance with a current control value received in the current data and (b) performing the receive operation in accordance with an alternative control value, in response to the comparison.

BRIEF DESCRIPTION OF THE DRAWINGS

FIGS. 4 and 5 comprise a flow chart depicting a first operation of the communication receiver in accordance with the preferred embodiment of the present invention.

FIGS. 6 and 7 comprise a flow chart depicting a second operation of the communication receiver in accordance with the preferred embodiment of the present invention.

DESCRIPTION OF THE PREFERRED EMBODIMENT

Figure 1:
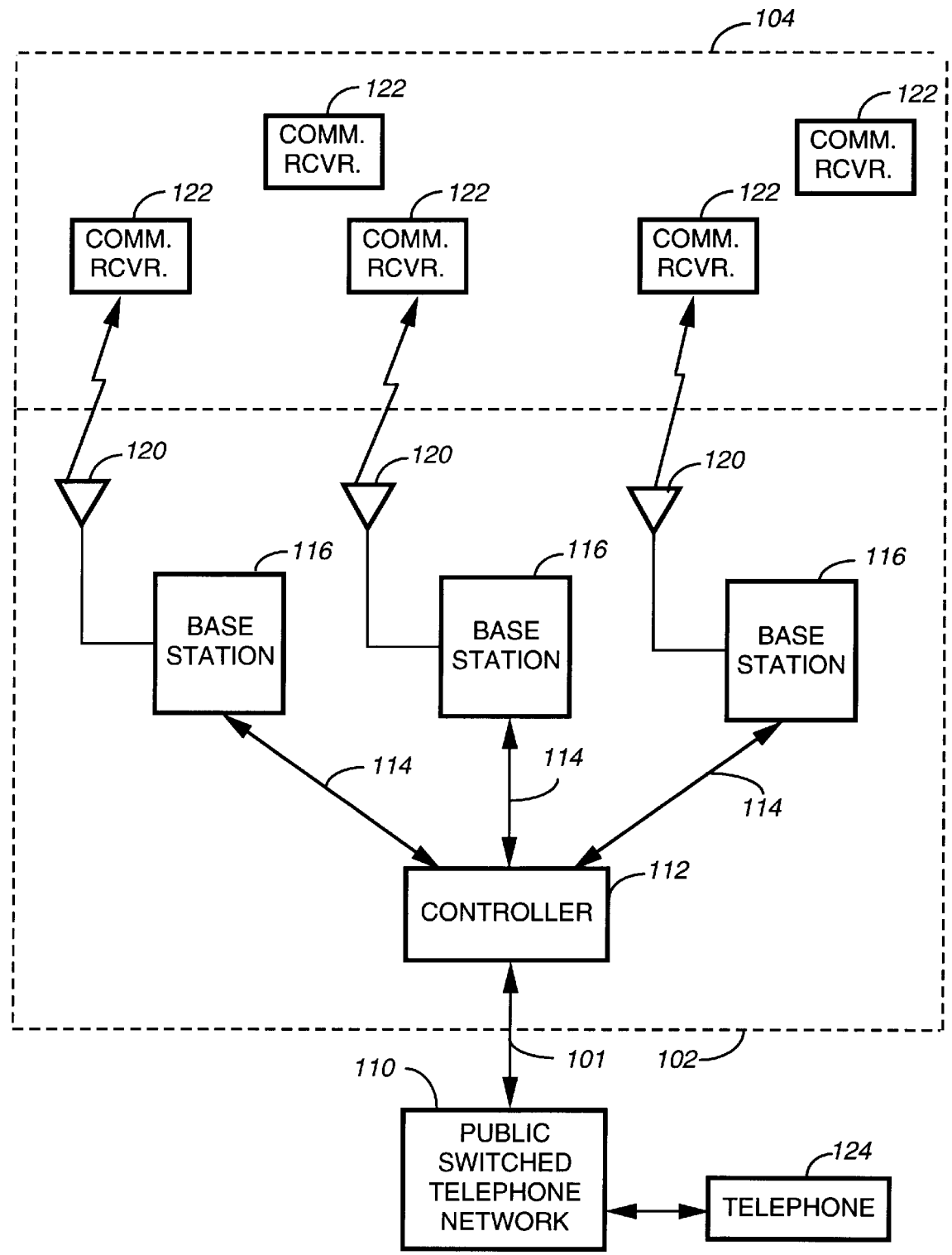
FIG. 1 is an electrical block diagram of a radio communication system in accordance with the preferred embodiment of the present invention.

Referring to FIG. 1, an electrical block diagram of a communication system in accordance with the preferred embodiment of the present invention comprises a fixed portion 102 and a portable portion 104. The fixed portion 102 includes a plurality of base stations 116, for communicating with the portable portion 104, utilizing conventional transmission techniques well known in the art, and coupled by communication links 114 to a controller 112 which controls the base stations 116. The hardware of the controller 112 is preferably a combination of the Wireless Messaging Gateway (WMG™) Administrator!™ paging terminal and the RF-Conductor!™ message distributor manufactured by Motorola, Inc. The hardware of the base stations 116 is preferably a Nucleus® Orchestra!™ transmitter manufactured by Motorola, Inc. It will be appreciated that other similar hardware can be utilized for the controller 112 and base stations 116.

Each of the base stations 116 transmits radio signals to the portable portion 104 comprising a plurality of communication receivers 122 via a transmitting antenna 120. The radio signals comprise selective call addresses and message transactions between the base stations 116 and the communication receivers 122. The controller 112 preferably is coupled by conventional telephone links 101 to a public switched telephone network (PSTN) 110 for receiving selective call messages therefrom. The selective call messages comprise voice and data messages received from the PSTN 110 using, for example, a conventional telephone 124 coupled to the PSTN 110 in a manner well known in the art.

Data and control transmissions between the base stations 116 and the communication receivers 122 preferably utilize an outbound protocol such as the Motorola FLEX™ digital selective call signaling protocol described more fully in U.S. Pat. No. 5,168,493 issued Dec. 1, 1992 to Nelson et al., and assigned to the assignee of the present invention and which is hereby incorporated by reference. This protocol utilizes well-known error detection and error correction techniques and is therefore tolerant to bit errors occurring during transmission, provided that the bit errors are not too numerous in any one code word.

Transmissions comprising data and control signals from the base stations 116 preferably utilize two and four-level frequency shift keyed (FSK) modulation. It will be appreciated that, alternatively, other error detecting and error correcting signaling protocols, modulation schemes, and transmission rates can be utilized as well.

Figure 2:
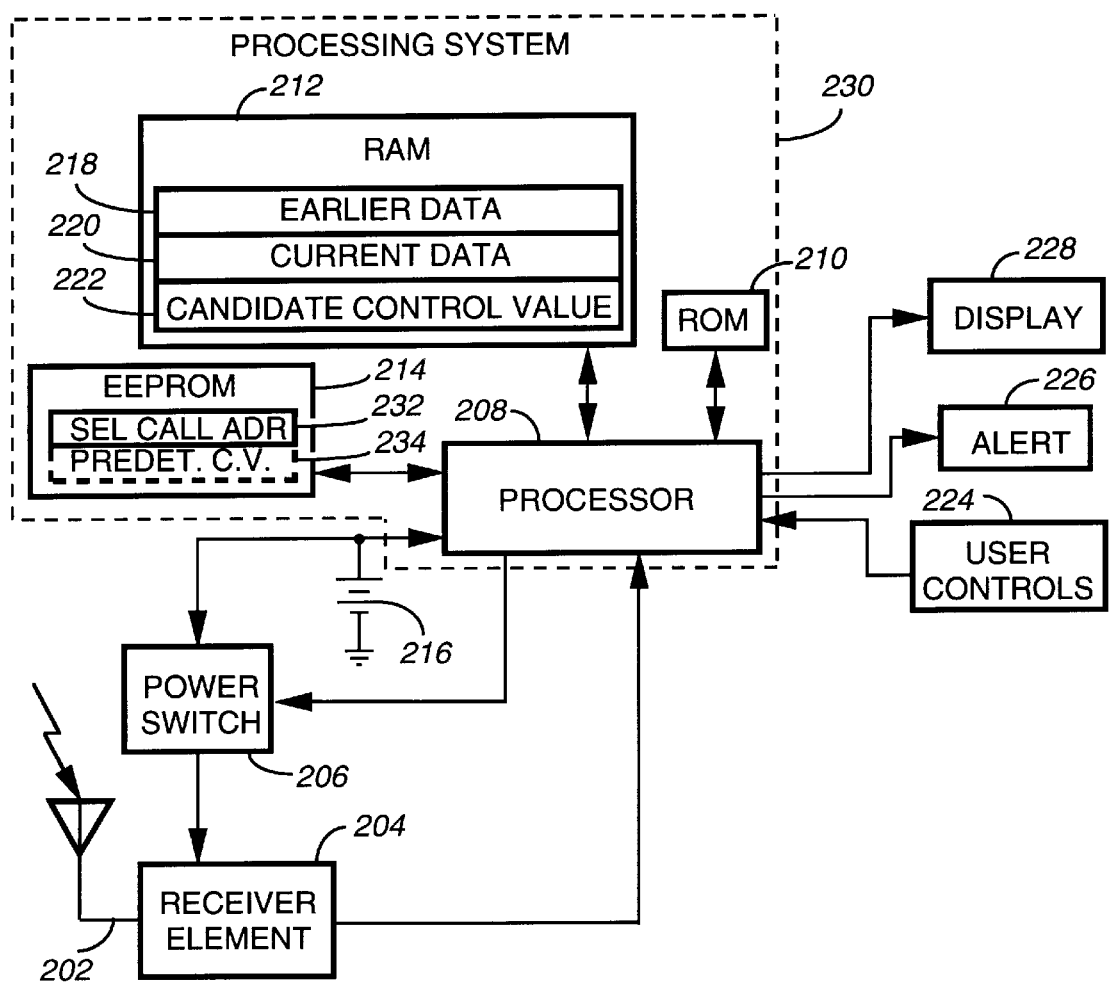
FIG. 2 is an electrical block diagram of a communication receiver utilized in the radio communication system of FIG. 1.

FIG. 2 is an electrical block diagram of the communication receiver 122 in accordance with the preferred embodiment of the present invention. The communication receiver comprises a receiver antenna 202 for intercepting RF signals from the base stations 116. The receiver antenna 202 is coupled to a receiver element 204, which includes a receiver utilizing conventional demodulation techniques for receiving the communication signal from the base stations 116. The RF signals received from the base stations 116 use conventional two and four-level FSK. Radio signals received by the receiver element 204 produce demodulated information, which is coupled to a processing system 230 for processing messages received from the base stations 116.

A conventional power switch 206, coupled to the processing system 230, is used to control the supply of power to the receiver element 204, thereby providing a battery saving function.

To perform the necessary functions of the communication receiver 122, the processing system 230 comprises a processor 208 is coupled to a random access memory (RAM) 212, a read-only memory (ROM) 210, and an electrically erasable programmable read-only memory (EEPROM) 214. Preferably, the processor 208 is similar to the M68HC05 micro-controller manufactured by Motorola, Inc. It will be appreciated that other similar processors can be utilized for the processor 208, and that additional processors of the same or alternative type, as well as a hardware decoder, can be added as required to handle the processing requirements of the processing system 230. It will be also appreciated that other types of memory, e.g., EEPROM or FLASH, can be utilized for the ROM 210, as well as the RAM 212. It will be further appreciated that the RAM 212 and the ROM 210, singly or in combination, can be incorporated as an integral portion of the processor 208.

The processing system 230 is programmed by way of the ROM 210 to process incoming messages. During message processing, the processor 208 decodes in a conventional manner an address in the demodulated data of the message, compares the decoded address with one or more selective call addresses 232 stored in the EEPROM 214, and when a match is detected, the processor 208 proceeds to process the remaining portion of the message.

Once the processor 208 has processed the message, it stores the message in the RAM 212, and a call alerting signal is generated to alert a user that a message has been received. The call alerting signal is directed to a conventional audible or tactile alerting device 226 for generating an audible or tactile call alerting signal.

The message can be accessed by the user through user controls 224, which provide functions such as lock, unlock, delete, read, etc. More specifically, by the use of appropriate functions provided by the user controls 224, the message is recovered from the RAM 212, and then displayed on a display 228, e.g., a conventional liquid crystal display (LCD).

In accordance with the present invention, the RAM 212 comprises locations for storing earlier data 218, i.e., at least one earlier control value and additional information such as an earlier frame and cycle number, received in a received frame of data preceding a current frame of data. In addition, the RAM 212 includes locations for storing current data 220, i.e., at least one current control value and additional information such as a current frame and cycle number, received in the current frame of data. The RAM 212 also includes a location for a candidate control value 222, which is described herein below. Optionally, the EEPROM 214 can include a predetermined control value 234, also described herein below.

Figure 3:
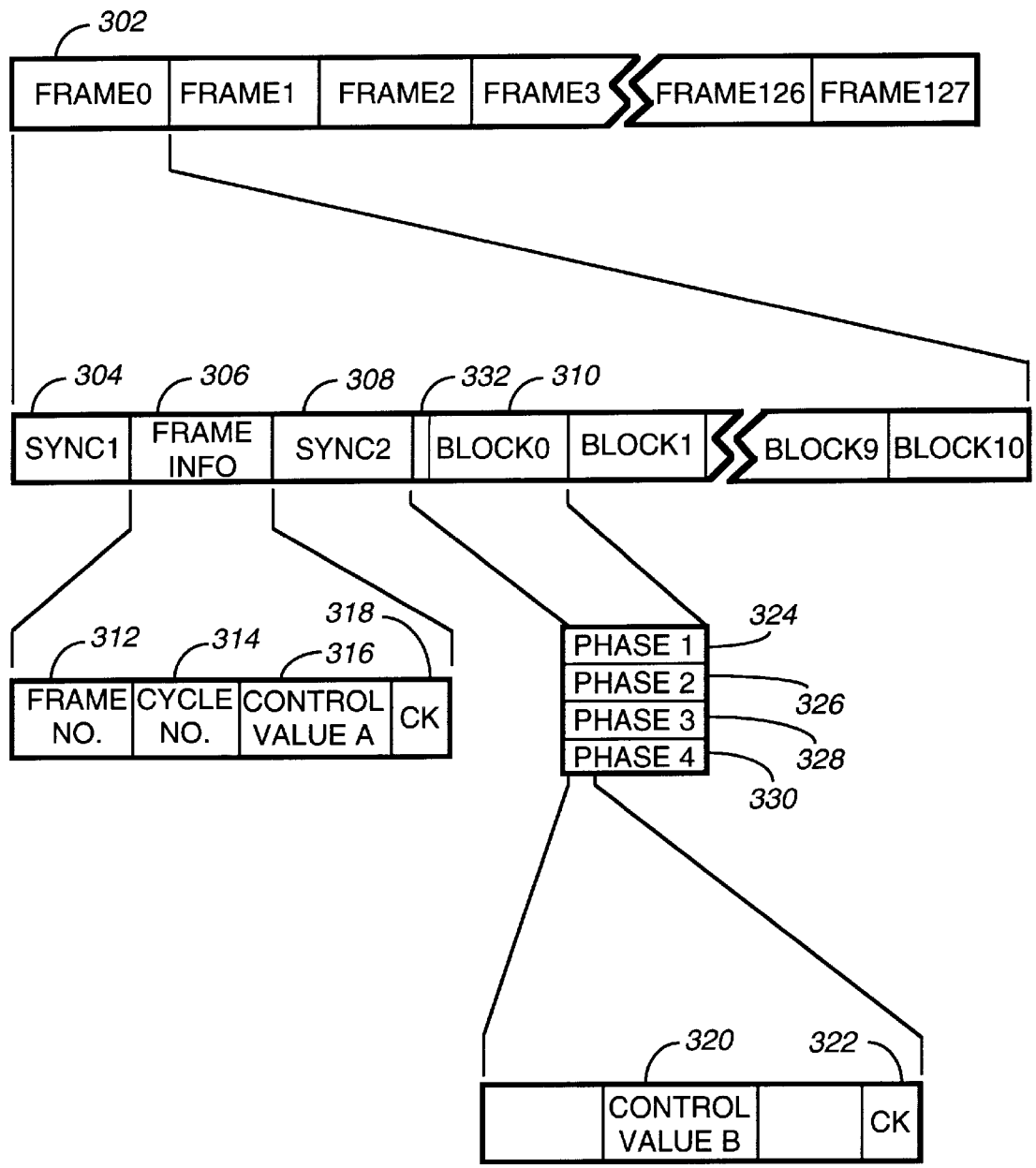
FIG. 3 is a timing diagram of a communication protocol utilized by the radio communication system in accordance with the preferred embodiment of the present invention.

FIG. 3 is a timing diagram of a communication protocol 300 utilized by the radio communication system in accordance with the preferred embodiment of the present invention. The protocol comprises a plurality of frames 302 (one hundred and twenty eight shown by way of example). Each frame 302 includes a sync1 field 304, a frame information code word 306, a sync2 field 308, and a plurality of blocks 310 (eleven blocks shown by way of example).

The frame information code word 306 preferably is a 32,21 BCH (Bose-Chadhuri-Hocquenghem) code word on which 2-bit error correction is performed. Specifically, the 32,21 BCH code word is processed in a manner well known in the art to detect and count one bit error, two bit errors, or more than two bit errors, and to correct up to two bit errors. When there are more than two bit errors, the code word has uncorrectable bit errors, the exact number of which is unknown. The frame information code word 306 comprises a frame number 312 and a cycle number 314 for identifying the frame and cycle, there being fifteen transmission cycles per hour of the one hundred and twenty eight frames, by way of example. The frame information code word 306 further comprises a control value "A" 316 for adjusting battery saving intervals utilized by the communication receiver 122 in response to system parameters such as traffic volume and repeat message configuration. In addition, the frame information code word 306 includes a check character 318 for helping to ensure quality of the received information.

Because the control value "A" 316 affects the battery saving operation of the communication receiver for an entire frame 302 of data, it is possible to miss messages if the frame information code word 306 is received with errors that are undetected. While the error detection and correction of the protocol is intended to minimize undetected errors, certain combinations of errored bits can produce a code word 306 that appears to be valid when, in fact, the code word 306 contains erroneous information.

Briefly, one aspect of the present invention greatly reduces the probability of accepting erroneous information in the frame information code word 306 even after the error detection and correction processing has indicated, incorrectly, that the code word is valid. This improvement preferably is obtained by making use of the fact that the frame number 312 and the cycle number 314 count in a sequence that is predictable from one frame 302 of data to the next. Before accepting the control value "A" 316 as truly valid, the accompanying frame number 312 and cycle number 314 are checked to determine whether they conform to the predictable sequence. If not, the frame information code word 306 is considered to contain undetected errors, and the control value "A" 316 received in the current frame information code word 306 is ignored. Preferably, an earlier received control value "A" 316 is used instead for adjusting the battery saving intervals during the current frame 302 of data. It will be appreciated that, alternatively, a predetermined default control value "A" 316 can be used as well for adjusting the battery saving intervals during the current frame of data instead of using the earlier received control value "A" 316.

In the frame information code word 306 of the FLEX™ protocol, for example, the above described aspect of the present invention reduces the probability of accepting an undetected error in the control value "A" 316 by a factor of 2,048, thereby advantageously reducing the probability of a missed message (or wasted battery energy) resulting from an incorrect battery saving operation.

The first block (BLOCK0) of the plurality of blocks 310 preferably contains, among other things, a block information code word 332, which preferably is also a 32,21 BCH code word on which 2-bit error correction is performed. The block information code word 332 comprises a control value "B" 320 which affects battery saving operation. The block information code word 332 also contains a check character 322 for improved error detection. Continuing with the example of the FLEX™ protocol, the control value "B" 320 is a "system collapse" value, which affects how long after the current frame 302 the communication receiver 122 will battery save (i.e., "sleep" before "waking up" to receive a subsequent frame 302. Clearly it is important to minimize the probability of accepting an erroneous control value "B" 320 having undetected errors, because sleeping too long can cause a missed message, while sleeping too briefly will waste battery power.

Briefly, a second aspect of the present invention makes use of the facts that (a) the system collapse changes infrequently in a given system and (b) the information of the blocks 310 can be transmitted in a plurality of (e.g., four) multiplex phases 324–330. In accordance with the present invention, the fixed portion 102 of the system transmits the control value "B" 320 a plurality of times in the plurality of multiplex phases 324–330. Preferably, in accordance with the present invention, the communication receiver 122 attempts to receive the control value "B" 320 in all the plurality of multiplex phases 324–330. The value utilized by the communication receiver 122 for the control value "B" 320 preferably is not allowed to change from an earlier received value unless: (a) a single new value for the control value "B" 320 is received at least a predetermined number of (e.g., 3) times with less than a predetermined number of (e.g., 2) errors from the plurality of multiplex phases 324–330 of the block information code word 332 of the frame 302, or (b) if the number of errors is equal to or greater than the predetermined number, a single new value for the control value "B" 320 is received at least the predetermined number of times from each of two pluralities of the multiplex phases 324–330 of two block information code words 332 occurring in two successive frames 302.

By making the control value "B" 320 resistant to changes when there are too many errors detected, as described above, the probability of erroneously switching to an improper battery saving operation is advantageously minimized. It will be appreciated that, alternatively, instead of utilizing the earlier received value for the control value "B" 320 when there are too many errors detected during reception of the block information code word 332, a predetermined value can be utilized. It will be further appreciated that the resistance to changes in the control value "B" can be made asymmetric. For example, changing from a first "sleep" interval to a second, shorter "sleep" interval could, for example, be designed to meet with less resistance than changing to a second, longer sleep interval (which, if erroneous, could cause a missed message).

Figure 4:
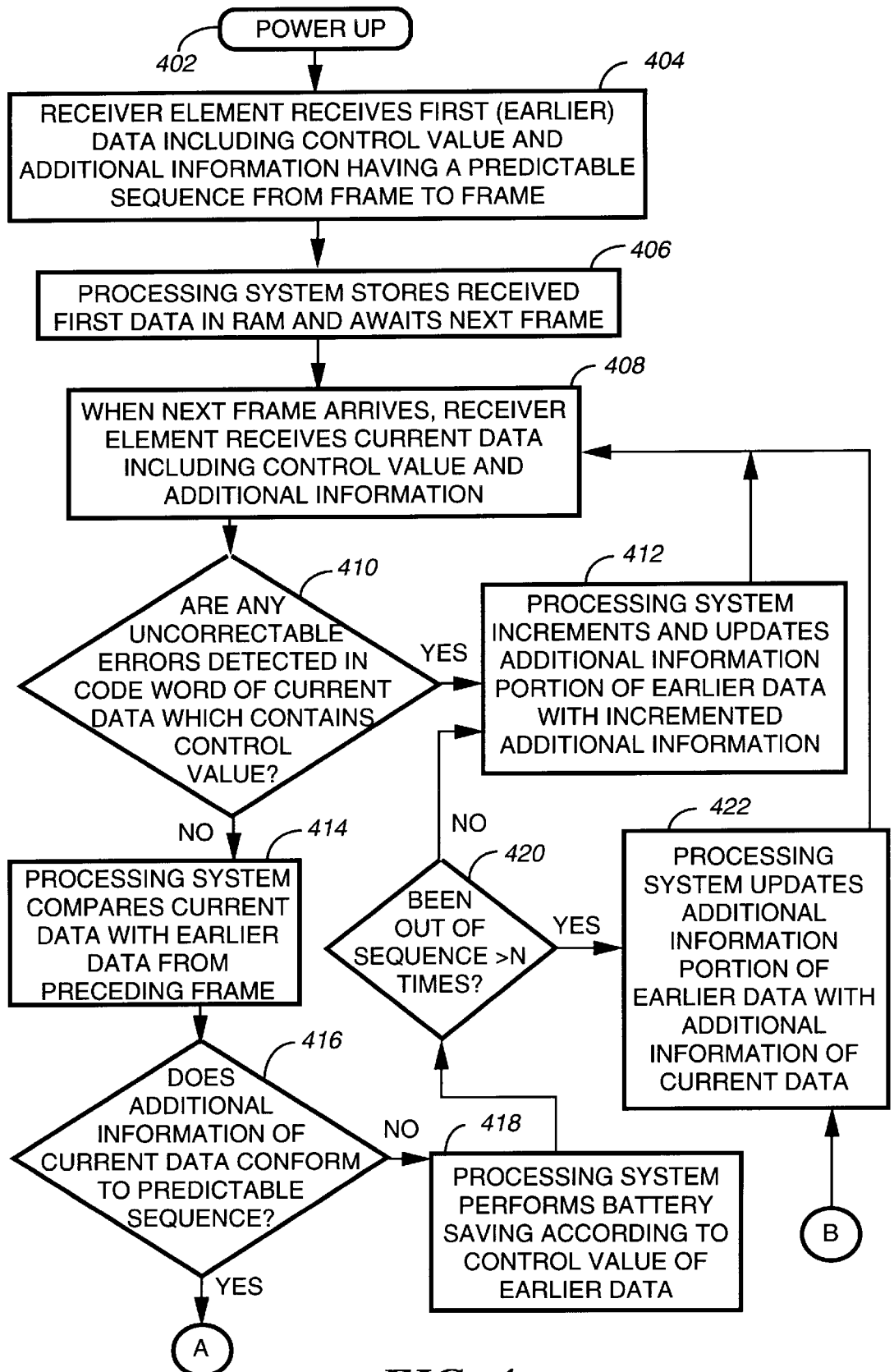

With reference to FIGS. 4 and 5, a flow chart depicts a first operation of the communication receiver 122 in accordance with the preferred embodiment of the present invention. After power up 402, the receiver element 204 receives 404 first (earlier) data 218 (i.e., the frame information code word 306) including the control value "A" 316 and additional information comprising the frame number 312 and the cycle number 314, which have a predetermined predictable sequence from one frame 302 to a next frame 302. The processing system 230 error corrects the received earlier data 218 and, if there are no uncorrectable errors, then stores 406 the received earlier data 218 in the RAM 212, and awaits the next frame of data that the communication receiver 122 is scheduled to receive according to the battery saving operation programmed for the communication receiver 122. When the next scheduled frame arrives, the receiver element 204 receives 408 the current data 220 including the control value "A" 316 and the additional information comprising the frame number 312 and the cycle number 314. The processing system 230 then performs conventional error detection and correction on the frame information code word 306 and then determines 410 whether any uncorrectable errors are detected therein. If so, the processing system 230 increments 412 the frame number 312 and the cycle number 314 of the earlier data 218 according to the predetermined sequence, and then updates the corresponding portions of the earlier data 218 with the incremented values of the frame number 312 and the cycle number 314. Then the flow returns to step 408, where the processing system awaits the next scheduled frame of data.

If, on the other hand, there are no uncorrectable errors detected in the frame information code word 306, then the processing system 230 compares the frame number 312 and the cycle number 314 received in the current data 220 with the frame number 312 and the cycle number 314 received in the earlier data 218 and stored in the RAM 212. The processing system 230 then checks 416 whether the frame number 312 and the cycle number 314 received in the current data 220 conform to the predictable sequence. If not, the frame information code word 306 is likely to contain undetected bit errors even though the code word 306 appears to be valid from the viewpoint of the previously applied conventional error detection process; therefore the processing system 230 preferably ignores the control value "A" 316 received in the current data 220 and performs 418 battery saving in accordance with the control value "A" 316 received in the earlier data 218. It will be appreciated that, alternatively, in step 414 instead of performing battery saving in accordance with the control value "A" 316 received in the earlier data 218, the processing system 230 can perform battery saving in accordance with the predetermined control value 234.

Next, the processing system 230 checks 420 whether the frame number 312 and the cycle number 314 received in the current data 220 have failed to conform to the predetermined sequence in more than a predetermined number of the most recently received frames 302. If not, the processing system 230 returns to step 412 to increment the frame number 312 and the cycle number 314 of the earlier data 218 according to the predetermined sequence, and then updates the corresponding portions of the earlier data 218 with the incremented values of the frame number 312 and the cycle number 314. If, on the other hand, the frame number 312 and the cycle number 314 received in the current data 220 have failed to conform to the predetermined sequence in more than a predetermined number of the most recently received frames 302, then the processing system concludes that the frame number 312 and the cycle number 314 being transmitted by the fixed portion 102 of the system is out of step with the communication receiver 122. In response, the processing system 230 updates 422 the frame number 312 and the cycle number 314 of the earlier data 218 with the frame number 312 and the cycle number 314 received in the current data 220. Flow then returns to step 408 to await the next scheduled frame of data.

If, on the other hand, in step 416 the processing system 230 determines that the frame number 312 and the cycle number 314 received in the current data 220 do conform to the predictable sequence, then the processing system 230 performs 424 battery saving according to the control value "A" 316 received in the current data 220 and replaces the control value "A" 316 stored with the earlier data 218 by the control value "A" 316 received in the current data 220. The processing system 230 then returns to step 422 to update the frame number 312 and the cycle number 314 of the earlier data 218 with the frame number 312 and the cycle number 314 received in the current data 220.

By refusing to adjust the battery saving operation of the communication receiver 122 according to the control value "A" received in the current data 220 unless the frame information code word 306 includes the expected frame number 312 and cycle number 314, the reliability of the control value "A" 316 is greatly enhanced. In the FLEX™ protocol, for example, the frame information code word 306 has 131,072 valid bit combinations. The inclusion of the expected frame number 312 and cycle number 314 as a further validity test for the control value "A" 316 reduces the number of valid frame information code word bit combinations to 64. This advantageously reduces the probability of acting upon an erroneous control value "A" 316 by a factor of 2,048.

Figure 7:
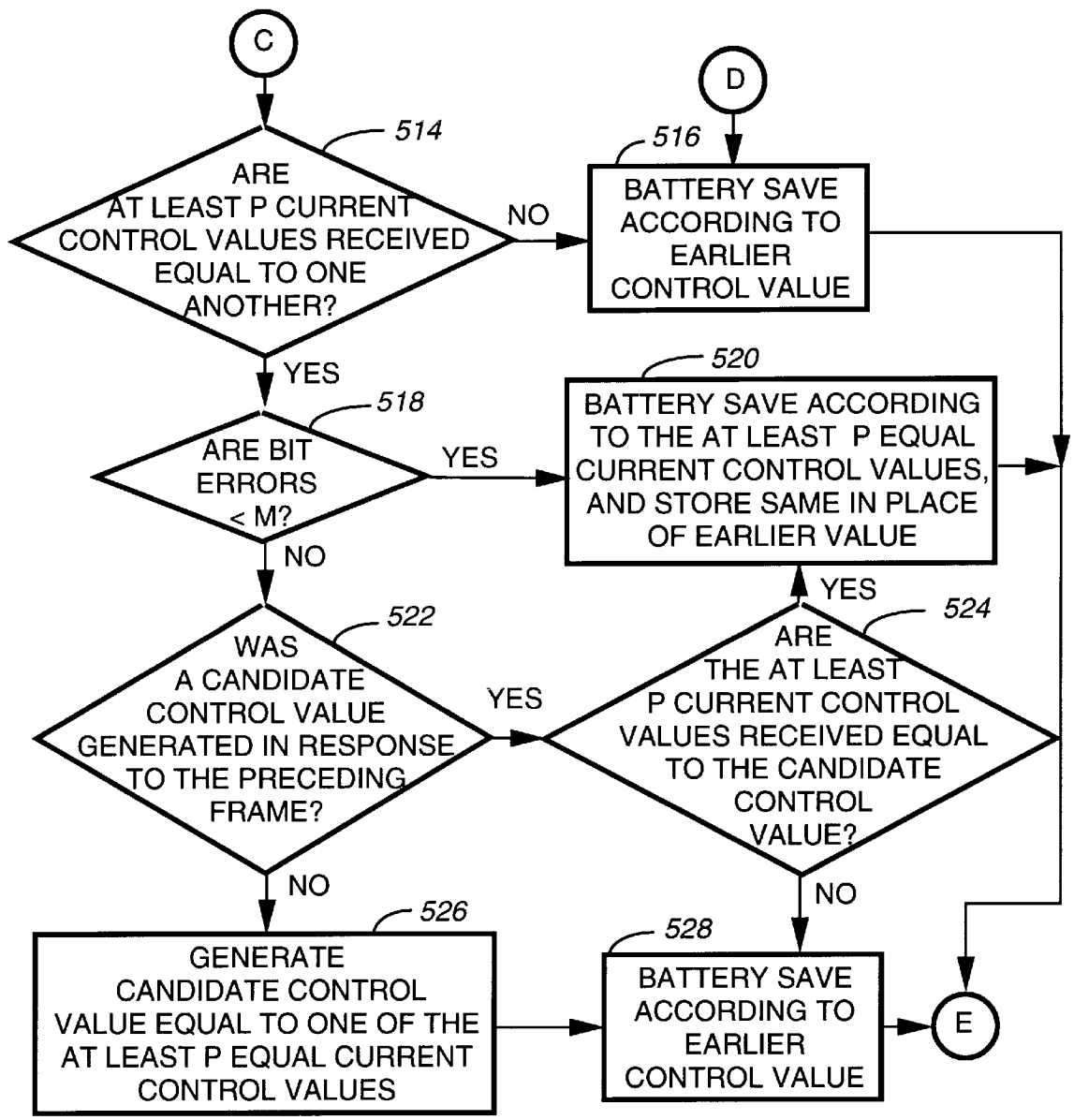

With reference to FIGS. 6 and 7, a flow chart depicts a second operation of the communication receiver 122 in accordance with the preferred embodiment of the present invention. Following power up 502, the receiver element receives 504 first (earlier) data 218 including a first (earlier) control value "B" 320, which is transmitted a predetermined number of times in a plurality of block information code words 332 during the frame 302 of data, as explained herein above. The processing system 230 then stores 506 the received earlier control value "B" 320 in the RAM 212, and awaits the next frame 302 of data that the communication receiver 122 is scheduled to receive in accordance with battery saving operation programmed therein. When the next scheduled frame 302 arrives, the receiver element 204 attempts to receive the current control value "B" 320 the predetermined number of times in the plurality of block information code words 332. The processing system 230 then checks 510 whether the current control value "B" 320 was received at least once. If not, the processing system 230 continues to battery save 516 according to the earlier control value "B" 320 stored with the earlier data 218, and the flow returns to step 508 to await the next scheduled frame.

If the control value "B" 320 was received at least once, then the processing system 230 checks 512 whether at least one control value "B" 320 received is equal to the earlier control value "B" 320 received in the earlier data 218. If so, the processing system 230 continues to battery save 516 according to the earlier control value "B" 320, and the flow returns to step 508 to await the next scheduled frame. If it is not true that at least one control value "B" 320 received is equal to the earlier control value "B" 320 received in the earlier data 218, then the processing system 230 checks 514 whether at least P current control values "B" 320 received are equal to one another, where P is a predetermined number. If not, the processing system 230 continues to battery save 516 according to the earlier control value "B" 320, and the flow returns to step 508 to await the next scheduled frame.

If in step 514 the processing system 230 determines that at least P current control values "B" 320 received are equal to one another, then the processing system 230 checks 518 whether there are less than a predetermined number of (e.g., 2) bit errors in the plurality of block information code words 332 received in the current data 220. If so, the processing system 230 battery saves 520 according to one of the at least P equal current control values "B" 320 and stores the one of the at least P equal current control values "B" 320 in place of the earlier control value "B" 320 stored in the earlier data 218. Flow then returns to step 508 to await the next scheduled frame.

If, on the other hand, in step 518 there are not less than a predetermined number of bit errors in the plurality of block information code words 332 received in the current data 220, then the processing system 230 checks 522 whether a candidate control value was generated in response to the last received frame. If so, the processing system 230 checks 524 whether the at least P equal current control values "B" 320 received are equal to the candidate control value. If so, the processing system 230 returns to step 520 to battery save according to one of the at least P equal current control values "B" 320 and stores the one of the at least P equal current control values "B" 320 in place of the earlier control value "B" 320 stored in the earlier data 218. Flow then returns to step 508 to await the next scheduled frame. If the at least P equal current control values "B" 320 received are not equal to the candidate control value, then the processing system 230 battery saves 528 according to the earlier control value "B" 320 stored in the earlier data 218. Flow then returns to step 508 to await the next scheduled frame.

If, on the other hand, in step 522 no candidate control value was generated in response to the last received frame, then the processing system 230 generates 526 a candidate control value equal to one of the at least P equal current control values "B" 320 and then battery saves in step 528 according to the earlier control value "B" 320. Flow then returns to step 508 to await the next scheduled frame.

If will be appreciated that, alternatively, in steps 516 and 528 instead of battery saving according to the earlier control value "B" 320, battery saving can be performed according to the predetermined control value 234. This is useful, for example, when it is possible to select a value for the predetermined control value 234 which is considered to produce no deleterious effects.

By refusing to adjust the battery saving operation of the communication receiver 122 according to the current control value "B" 320 unless the block information code word 332 is received consistently as described herein above, the reliability of the control value "B" 320 is enhanced. This advantageously reduces the probability of incorrect battery saver operation, which can result in missed messages, reduced effective sensitivity, and shortened battery life.

It should be apparent by now that the present invention provides a method and apparatus for determining a response to a control value periodically transmitted by a communication system for controlling a receive operation of a receiver. The method and apparatus improve the probability of detecting and rejecting erroneous control values, thereby reducing the problems associated therewith. While, by way of example, portions of the FLEX™ protocol have been utilized in describing the preferred embodiment of the present invention, it will be appreciated that other protocols which can transmit control values that affect receive operation of the communication receivers in the system can be utilized as well in accordance with the present invention.

What is claimed is:

1. A method of determining a response to a control value periodically transmitted by a communication system in at least one code word of a frame of data of a communication protocol, the control value for controlling a receive operation of a receiver operating in the communication system, the method comprising in the receiver the steps of:

accepting and storing earlier data from an earlier transmission of the frame of data;

receiving current data from a current transmission of the frame of data;

thereafter comparing the earlier data and the current data;

detecting errors in the at least one code word of the current data; and selecting from (a) performing the receive operation in accordance with a current control value received in the current data and (b) performing the receive operation in accordance with an alternative control value, in response to the comparison, wherein the control value is transmitted along with additional information having a predictable sequence from one frame of data to a next frame of data, and wherein the receiving step comprises the step of receiving the control value and the additional information, and wherein the comparing step comprises the step of comparing current additional information received in the current data with earlier additional information received and stored with the earlier data, and wherein the selecting step comprises the step of performing the receive operation in accordance with the control value received in the current data, in response to no uncorrectable errors being detected in said step of detecting errors, and the comparison indicating that the current additional information conforms to the predictable sequence.

2. The method of claim 1, wherein the selecting step comprises the step of performing the receive operation in accordance with the alternative control value, in response to the comparison indicating that the current additional information does not conform to the predictable sequence.

3. A method of determining a response to a control value periodically transmitted by a communication system in at least one code word of a frame of data of a communication protocol, the control value for controlling a receive operation of a receiver operating in the communication system, the method comprising in the receiver the steps of:

accepting and storing earlier data from an earlier transmission of the frame of data;

receiving current data from a current transmission of the frame of data;

thereafter comparing the earlier data and the current data; and selecting from (a) performing the receive operation in accordance with a current control value received in the current data and (b) performing the receive operation in accordance with an alternative control value, in response to the comparison, wherein the control value is transmitted a predetermined plurality of times in a plurality of code words that are included in at least two multiplex phases during the frame of data, and wherein the earlier data comprises an earlier control value, and wherein the receiving step comprises the step of attempting to receive the current control value the predetermined plurality of times from the current transmission.

4. The method of claim 3, wherein the selecting step comprises the step of performing the receive operation in accordance with the alternative control value, in response to failing to receive the current control value at least once from the current transmission.

5. The method of claim 3, wherein the step of attempting to receive the current control value results in receiving the current control value at least once from the current transmission, and wherein the step of making the comparison comprises the step of comparing the earlier control value with all current control values received, and wherein the selecting step comprises the step of performing the receive operation in accordance with the earlier control value, in response to at least one of the current control values received being equal to the earlier control value.

6. The method of claim 3, further comprising the step of detecting errors in the at least one code word of the current data, wherein the step of attempting to receive the current control value results in receiving the current control value at least once from the current transmission, and wherein the step of making the comparison comprises the step of comparing the earlier control value with all current control values received, and wherein the selecting step comprises the step of performing the receive operation in accordance with one of at least P current control values, in response to the at least P current control values received being equal to one another and different from the earlier control value, wherein P is a first predetermined number, and no more than a second predetermined number of bit errors having been detected in the plurality of multiplex phases.

7. The method of claim 3, further comprising the step of detecting errors in the at least one code word of the current data, wherein the step of attempting to receive the current control value results in receiving the current control value at least once from the current transmission, and wherein the step of making the comparison comprises the step of comparing the earlier control value with all current control values received, and wherein the selecting step comprises the steps of:

generating a candidate control value equal to one of at least P current control values received and performing the receive operation in accordance with the earlier control value, in response to the at least P current control values received being equal to one another and different from the earlier control value, wherein P is a first predetermined number, and more than a second predetermined number of bit errors being detected in the plurality of code words, and no candidate control value having been generated in response to an immediately preceding received frame of data.

8. The method of claim 7, further comprising the step of detecting errors in the at least one code word of the current data, wherein the step of making the comparison comprises the step of comparing the earlier control value and the candidate control value with all the current control values received, and wherein the selecting step comprises the steps of:
performing the receive operation in accordance with one of the at least P current control values, in response to the at least P current control values received being equal to one another and different from the earlier control value and equal to the candidate control value, and more than a second predetermined number of bit errors being detected in the plurality of code words, and the candidate control value having been generated in response to an immediately preceding received frame of data.

9. A communication receiver for determining a response to a control value periodically transmitted by a communication system in at least one code word of a frame of data of a communication protocol, the control value for controlling a receive operation of the communication receiver while operating in the communication system, the communication receiver comprising:

a battery for supplying power to the communication receiver;

a switch coupled to the battery and coupled to a processing system for controlling the power to a receiver element;

a memory for accepting and storing earlier data from an earlier transmission of the frame of data;

the receiver element coupled to the memory and coupled to the battery for receiving current data from a current transmission of the frame of data; and the processing system coupled to the memory and coupled to the receiver element for making a comparison of the earlier data and the current data, wherein the processing system is programmed for selecting from (a) performing the receive operation in accordance with a current control value received in the current data and (b) performing the receive operation in accordance with an alternative control value, in response to the comparison, wherein the control value is transmitted along with additional information having a predictable sequence from one frame of data to a next frame of data, and wherein the receiver element is further for receiving the control value and the additional information, and wherein the processing system is further programmed for comparing current additional information received in the current data with earlier additional information received and stored with the earlier data, and for performing the receive operation in accordance with the control value received in the current data, in response to no uncorrectable errors being detected in the at least one code word, and the comparison indicating that the current additional information conforms to the predictable sequence.

10. The communication receiver of claim 9, wherein the processing system is further programmed for performing the receive operation in accordance with the alternative control value, in response to the comparison indicating that the current additional information does not conform to the predictable sequence.

11. A communication receiver for determining a response to a control value periodically transmitted by a communication system in at least one code word of a frame of data of a communication protocol, the control value for controlling a receive operation of the communication receiver while operating in the communication system, the communication receiver comprising:

a battery for supplying power to the communication receiver;

a switch coupled to the battery and coupled to a processing system for controlling the power to a receiver element;

a memory for accepting and storing earlier data from an earlier transmission of the frame of data;

the receiver element coupled to the memory and coupled to the battery for receiving current data from a current transmission of the frame of data; and the processing system coupled to the memory and coupled to the receiver element for making a comparison of the earlier data and the current data, wherein the processing system is programmed for selecting from (a) performing the receive operation in accordance with a current control value received in the current data and (b) performing the receive operation in accordance with an alternative control value, in response to the comparison, wherein the control value is transmitted a predetermined plurality of times in a plurality of code words that are included in at least two multiplex phases during the frame of data, and wherein the earlier data comprises an earlier control value, and wherein the receiver element is further for attempting to receive the current control value the predetermined plurality of times from the current transmission.

12. The communication receiver of claim 11, wherein the processing system is programmed for performing the receive operation in accordance with the alternative control value, in response to failing to receive the current control value at least once from the current transmission.

13. The communication receiver of claim 11, wherein the receiver element is further for receiving the current control value at least once from the current transmission, and wherein the processing system is further programmed for comparing the earlier control value with all current control values received, and for performing the receive operation in accordance with the earlier control value, in response to at least one of the current control values received being equal to the earlier control value.

14. The communication receiver of claim 11, wherein the receiver element is further for receiving the current control value at least once from the current transmission, and wherein the processing system is further programmed for comparing the earlier control value with all current control values received, and for performing the receive operation in accordance with one of at least P current control values, in response to the at least P current control values received being equal to one another and different from the earlier control value, wherein P is a first predetermined number, and no more than a second predetermined number of bit errors having been detected in the plurality of code words.

15. The communication receiver of claim 11, wherein the receiver element is further for receiving the current control value at least once from the current transmission, and wherein the processing system is further programmed for comparing the earlier control value with all current control values received, and for generating a candidate control value equal to one of the current control values received and performing the receive operation in accordance with the earlier control value, in response to the at least P current control values received being equal to one another and different from the earlier control value, wherein P is a first predetermined number, and more than a second predetermined number of bit errors being detected in the plurality of code words, and no candidate control value having been generated in response to an immediately preceding received frame of data.

16. The communication receiver of claim 15, wherein the processing system is further programmed for comparing the earlier control value and the candidate control value with all the current control values received, and for performing the receive operation in accordance with one of the at least P current control values, in response to the at least P current control values received being equal to one another and different from the earlier control value and equal to the candidate control value, and more than a second predetermined number of bit errors being detected in the plurality of code words, and the candidate control value having been generated in response to an immediately preceding received frame of data.

\* \* \* \* \*